Jan. 15, 1924.
J. H. WAGENHORST
1,481,164
METHOD OF MAKING WHEELS
Filed Dec. 26, 1918     3 Sheets-Sheet 1
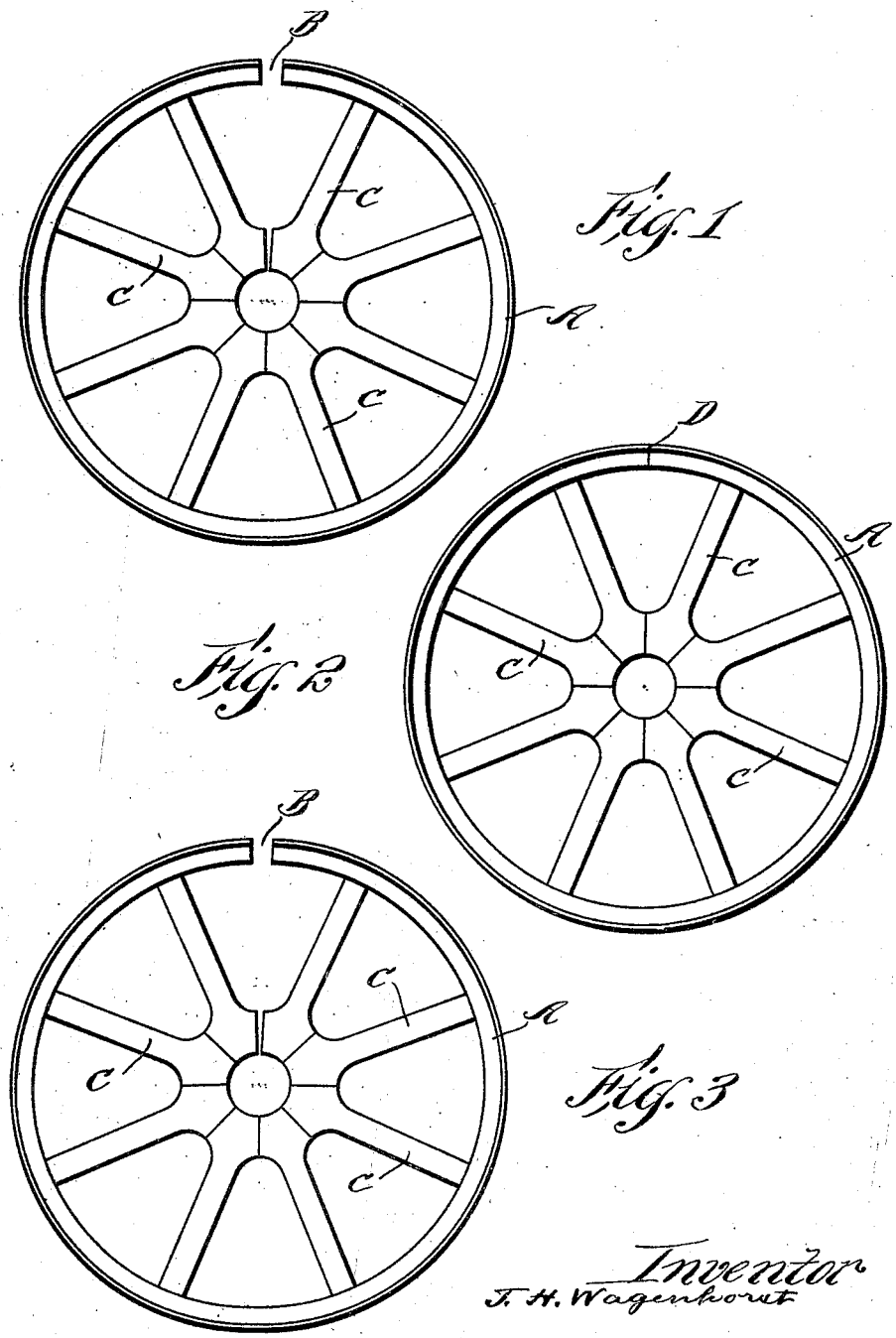

Jan. 15, 1924. 1,481,164
J. H. WAGENHORST
METHOD OF MAKING WHEELS
Filed Dec. 26, 1918 3 Sheets-Sheet 2

Inventor
J. H. Wagenhorst
By Hull Smith Brock & West
Attys.

Jan. 15, 1924.  
J. H. WAGENHORST  
METHOD OF MAKING WHEELS  
Filed Dec. 26, 1918
1,481,164
3 Sheets-Sheet 3
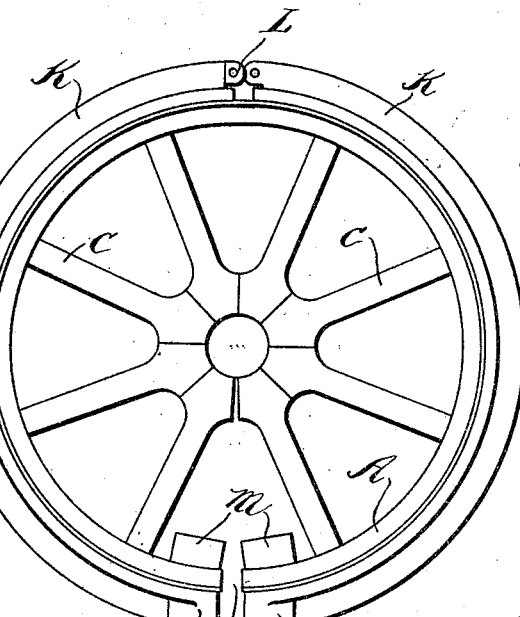
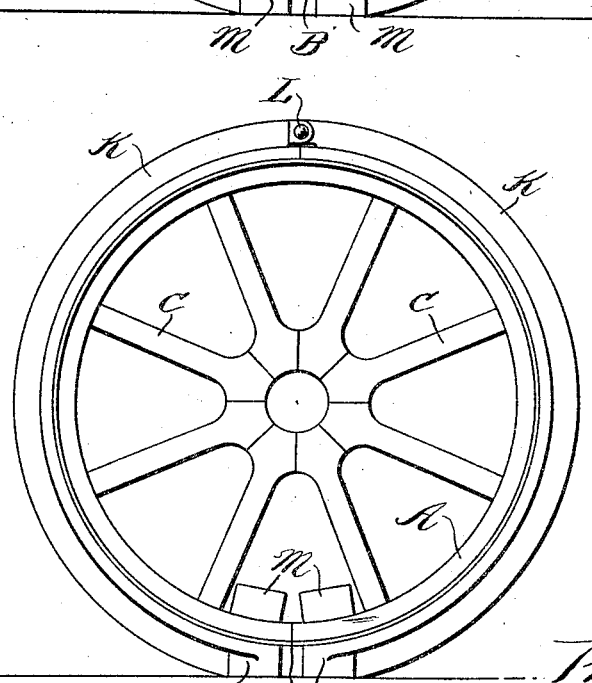
Inventor  
J. H. Wagenhorst  
By Hull Smith Brock & West  
Attys.

Patented Jan. 15, 1924.

1,481,164

UNITED STATES PATENT OFFICE.

JAMES H. WAGENHORST, OF AKRON, OHIO.

METHOD OF MAKING WHEELS.

Application filed December 26, 1918. Serial No. 268,244.

*To all whom it may concern:*

Be it known that I, JAMES H. WAGENHORST, a citizen of the United States, residing at Akron, in the county of Summit and State of Ohio, have invented a certain new and useful Improvement in Methods of Making Wheels, of which the following is a full, clear, and exact description, reference being had to the accompanying drawings.

This invention relates generally to wheels and the method of making the same, and also to the improved method and means for assembling and uniting various parts of the wheel.

The purpose of the invention is to provide a wheel consisting of wooden spokes and a metal felly, and the invention has for its object the quick and easy manufacture of a wheel body embodying these characteristic features.

The invention also has for its object to provide a wheel body of this type in connection with a tire carrying rim connected to the wheel body.

Another object of the invention is to provide an improved method of uniting the various parts, and also novel means for carrying out such methods, whereby the cost of manufacture can be greatly reduced and at the same time a strong and durable wheel may be provided.

With these various objects in view the invention consists in the novel features of construction, combination and arrangement, and the various methods and steps, hereinafter fully described and pointed out in the claims.

Figure 5:
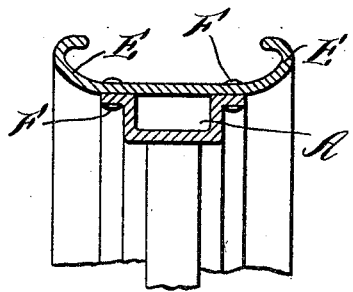
Figure 4:
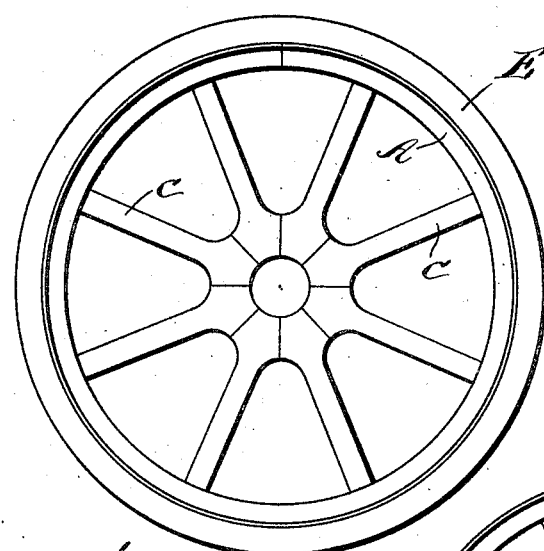
Figure 6:
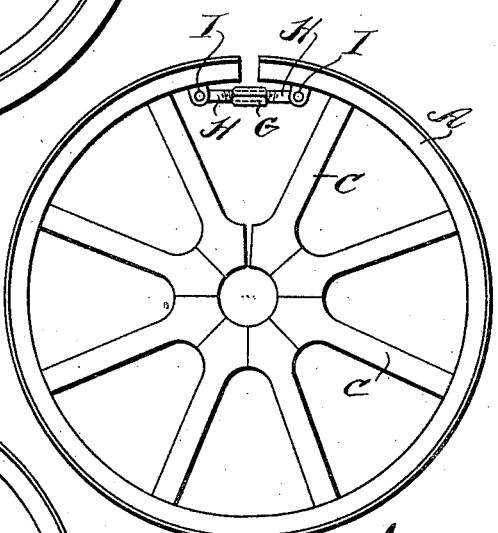
Figure 7:
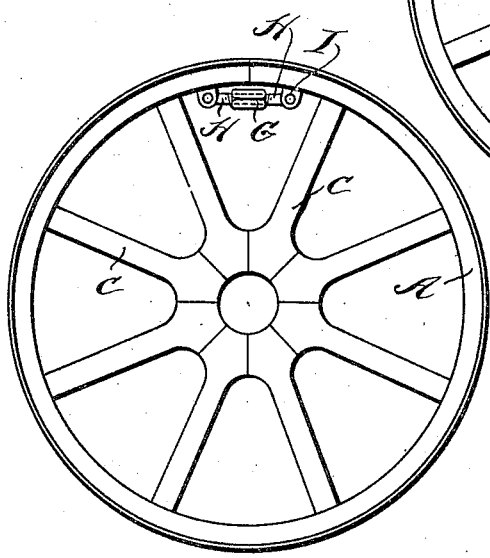

In the drawings forming a part of this specification Fig. 1 is a view showing a divided felly with wooden spokes arranged therein; Fig. 2 is a similar view showing the ends of the felly brought together and connected, and the spokes properly positioned and placed under compression; Fig. 3 is a view showing a divided felly with the wooden spokes arranged therein; Fig. 4 is a view showing said felly contracted to bring the ends of the felly together and a tire carrying rim arranged upon said felly and connected thereto; Fig. 5 is a detail sectional view taken on the line 5—5 of Fig. 4; Fig. 6 is a view showing a divided felly with the wooden spokes arranged therein together with means for bringing the felly ends together; Fig. 7 is a view of the completed wheel with the felly ends brought together; Fig. 8 is a view of a divided felly with the spokes arranged therein, said felly being arranged within a contracting and shaping device which carries electric welding terminals for the purpose of welding together the abutting ends of the felly when said felly is contracted and the wheel body as a whole placed under compression; and Fig. 9 is a view of the contracted wheel body and welded felly.

In constructing a wheel body as illustrated in Figs. 1 and 2 I employ a divided metal felly A which may be of any desired cross-sectional shape. This felly is rolled approximately in the form of a circle and is left separated at one point marked B. The wooden spokes C are preferably constructed with tenons at their outer ends which are inserted in suitable openings produced in the felly, and their inner ends are made tapering as shown and are assembled to provide the hub portion of the wheel body.

The felly A being approximately circular in form permits the spokes to be easily assembled within the felly as shown in Fig. 1 and as thus far assembled the felly and spokes can be transferred to a suitable compressing and shaping device for the purpose of bringing the felly into a true circle at the same time that radial inward pressure is applied to all of the spokes so as to bring them into their proper fixed relations with reference to each other and to the metal felly; and when the contracting and shaping operations are accomplished the meeting ends of the felly are united by welding as indicated at D, thereby providing a wheel body of a minimum number of parts and which will be exceedingly strong and durable and which owing to the simplicity of assembly and manufacture can be made at a considerably reduced cost.

As before stated the felly A can be of any desired shape in cross-section and can be used in connection with either a demountable tire carrying rim or one permanently connected thereto.

In Figs. 3, 4 and 5 I have shown how the principle of my invention thus far set forth can be utilized in connection with a permanently connected tire carrying rim, and by reference to Fig. 3 it will be seen that the metal felly A is employed, divided at the single point B, and that the spokes C are arranged therein exactly the same as previously described.

This felly with the spokes therein is then contracted or compressed and forced within a tire carrying rim E, preferably of the clincher type as shown, and after the contracted felly is inserted within the continuous inextensible tire carrying rim E, said felly and rim are united by slot welding at definite points as indicated at F, in Fig. 5, thereby providing a wheel body consisting of the wooden spokes, divided felly within which the spokes are assembled, and the tire carrying rim permanently connected to the felly, the felly being properly contracted and shaped when inserted within the tire carrying rim and then maintained in such contracted position by said rim, the welding of the felly to the rim being sufficient to maintain all of the parts in their proper relative positions.

If desired, a suitable mechanical contrivance can be employed for contracting the ends of the felly and maintaining them in their proper contracted positions, and in Fig. 6 I have shown one such mechanical contrivance consisting of double threaded nut G connected to the bolts H which in turn are connected to inwardly extending lugs I attached to the felly adjacent the division thereof, it being understood that the spokes can be assembled as previously described within the felly and then, by turning the nut or turnbuckle G, the ends of the felly are brought together as shown in Fig. 7 and the spokes placed under compression, providing a finished wheel body without the use of welding, but at the same time mechanically connecting the ends against circumferential separation.

In Figs. 8 and 9 I have shown one form of apparatus capable of simultaneously contracting and shaping the felly, applying radial compression to the spokes, and welding the abutting ends of the felly; and it will be understood that various other forms of devices embodying the broad principle hereinafter explained may be employed for accomplishing this result.

By reference to Fig. 8 it will be noted that the felly A has the single division point B and that the spokes C are assembled therein as heretofore explained, and the divided felly with the spokes therein is then placed in a contracting device comprising two curved sections K pivotally connected together at L and these sections are of such size and shape, that when brought together by any suitable power device, a complete true circle will be provided bringing together the ends of the felly and subjecting the felly as a whole to the proper shaping and compression so that the proper radial compression will be communicated to all of the spokes; and these sections K are provided at their ends with welding terminals M, of any approved construction, and receiving their current in the customary manner of electric welding apparatus.

In operation the spokes are first arranged within the divided felly and then the divided felly with the spokes therein is placed in the contracting and welding device and the ends of the felly brought together and welded, thus providing a simultaneous shaping of the felly, compression of the wheel body as a whole and union of the felly ends.

By accomplishing these operations in the manner herein set forth a strong and durable wheel is provided and the cost of manufacturing the same materially reduced.

Having thus described my invention, what I claim is:—

The hereindescribed method of making wheels which consists in providing a metallic felly divided at one point, assembling a plurality of spokes within said felly, contracting said felly upon said spokes, bringing the felly into true circular shape, placing the spokes under radial compression and securing the felly ends against circumferential separation.

In testimony whereof, I hereunto affix my signature.

JAMES H. WAGENHORST.